United States Patent [19]

Stich et al.

[11] Patent Number: 4,538,974
[45] Date of Patent: Sep. 3, 1985

[54] VANE-TYPE OIL PUMP FOR AUTOMOTIVE VEHICLE

[75] Inventors: Bodo Stich, Wiesbaden; Ernst Hassler, Camberg; Slawomir Adamowicz, Taunusstein, all of Fed. Rep. of Germany

[73] Assignee: Glyco Antriebstechnik GmbH, Wiesbaden, Fed. Rep. of Germany

[21] Appl. No.: 590,483

[22] Filed: Mar. 16, 1984

[30] Foreign Application Priority Data

Sep. 17, 1983 [DE] Fed. Rep. of Germany ....... 3333647

[51] Int. Cl.³ .............. F01M 1/02; F04C 2/344; F04C 15/04; F04B 1/08
[52] U.S. Cl. ..................... 418/26; 418/27; 418/30; 417/220
[58] Field of Search ................. 418/24–27, 418/30; 417/220

[56] References Cited

U.S. PATENT DOCUMENTS

| | | | |
|---|---|---|---|
| 2,142,275 | 1/1939 | Lane | 418/26 |
| 2,894,458 | 7/1959 | Hallman | 418/26 X |
| 2,962,969 | 12/1960 | French | 418/26 X |
| 4,342,545 | 8/1982 | Schuster | 418/26 |

FOREIGN PATENT DOCUMENTS 49838  4/1982  European Pat. Off. ............. 418/26

Primary Examiner—Richard E. Gluck

[57] ABSTRACT

A pump has a stator formed with intake and output ports connected to the lubricating system of an internal-combustion engine of an automotive vehicle for flow therethrough, a rotor in the stator positively driven by the engine output, an adjustment element operatively connected to the stator and rotor and displaceable between one end position corresponding to relatively great flow through the pump when the rotor is rotated by the output and an opposite end position corresponding to substantially no flow through the pump when the rotor is rotated by the engine output, and a biasing unit for urging the adjustment element toward the one end position with a fixed force. An abutment unit is connected to the adjustment element of the pump for limiting displacement of same from an intermediate position between its end positions into the opposite end position corresponding to no flow through the pump.

1 Claim, 5 Drawing Figures

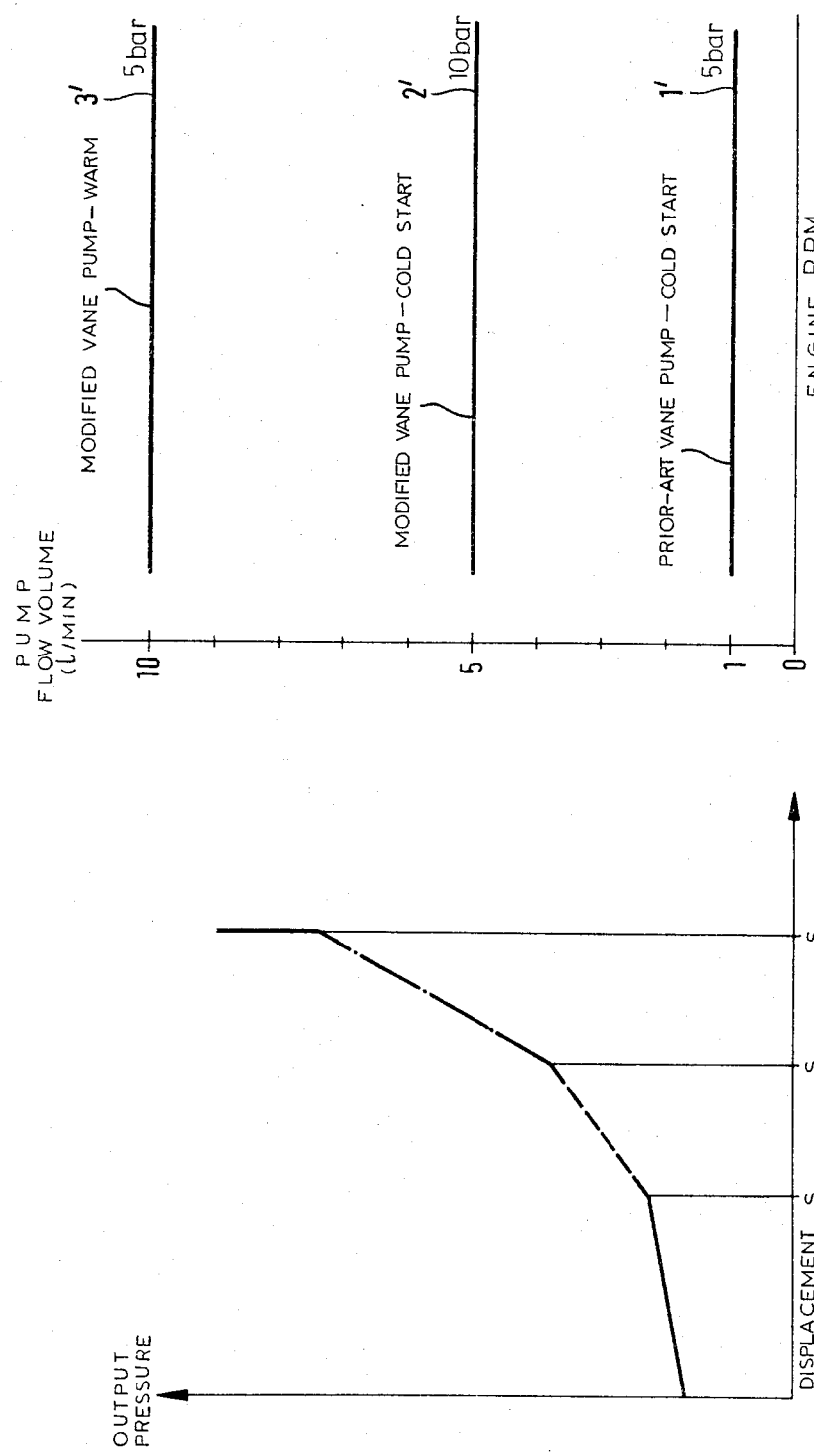

VANE-TYPE OIL PUMP FOR AUTOMOTIVE VEHICLE

FIELD OF THE INVENTION

The present invention relates to a pump. More particularly this invention concerns an oil pump used for lubricating an automotive vehicle.

BACKGROUND OF THE INVENTION

An oil pump for an automotive vehicle is normally a standard positive-displacement gear pump that is directly and permanently driven by the engine drive shaft. The pump has an intake connected to a sump formed by the engine oil pan and an output that leads to all of the various joints to be lubricated, which joints are set up so that any excess lubricant flow will run back into the sump.

Such an arrangement has the advantage of great simplicity, as a gear pump can be counted on to give relatively troublefree performance for years. In addition such a pump will even get the lubricant circulating when it is very viscous in very cold weather, providing lubrication to the engine even on cold starts.

Nonetheless the average engine normally only needs a certain maximum lubricant flow, measured in volume with respect to time (e.g. liters/minute). The flow through the positive-displacement gear pump, however, is directly proportional to its drive speed, typically in revolutions per unit of time, and is not responsive to the engine's need of lubricant or the viscosity of the lubricant, which is largely a function of its temperature. Thus at high engine speeds in cold starts the pump can produce dangerously high pressures, and at low speeds in cold starts the pressure can be inadequate for proper lubrication.

It is therefore standard to provide a pressure-limiting valve that is connected between the output of the pump and the sump and that opens above a predetermined pressure, normally about 5bar, to prevent this pressure from damaging any hoses or the like in the lubricating system. The valve curve can closely correspond to the engine's need for lubricant which increases slightly, but generally asymptotically, with increasing engine speed.

Although such a solution has the advantage of simplicity, preventing overpressures that would be caused by using a constant-displacement pump, it is wasteful of energy. The extra pump capacity is squandered, its mechanical energy being converted into heat that must be dissipated. In these energy-conscious times such inefficient energy use constitutes a distinct disadvantage of this system.

Accordingly, U.S. Pat. No. 4,342,545 describes a vane pump used in an automatic transmission to keep pressures steady even when drive speed varies. This pump comprises a stator or housing having an outer part forming intake and output ports and an inner part pivotal about a pivot axis on the outer part and defining a chamber centered on a stator axis extending between the ports. These ports open axially into the chamber at locations diametrally offset relative to the axis and the chamber is closed radially outward relative to the axis by the inner part. A rotor has a body rotatable in the chamber about a rotor axis parallel to and normally offset from the stator axis and having an outer surface centered on the rotor axis. The rotor body is formed with a plurality of angularly equispaced and radially extending guides that open at the outer rotor surface. The rotor axis does not move relative to the stator, but the stator axis defined by the inner stator part can move from an inner position coinciding with the rotor axis to an outer one parallel to the offset therefrom. Respective vanes of substantially the same radial length are received in the guides and have radially outer ends riding on the inner stator surface and radially opposite inner ends. At least one circular inner ring on the body has an outer ring surface radially outwardly engaging the inner vane ends. These vanes angularly define compartments axially closed by the stator outer part, radially outwardly closed by the stator inner part, and radially inwardly closed by the inner ring.

Thus when the stator axis is offset in one direction from the rotor axis and the rotor is rotated in a predetermined sense, the compartments move from the intake to the output port and decrease in volume at the output port. A spring-type biasing unit urges the inner housing part pivotally about the pivot axis in the one direction increasing compartment size with a fixed force and a hydraulic biasing unit is pressurized from the outlet port to urge the inner housing part pivotally in the opposite direction decreasing compartment size.

With this system, therefore, as the pressure at the output port increases, the inner housing part is pivoted inward to bring the rotor and stator axes together, and thereby reduce the eccentricity of the inner stator surface relative to the rotor axis and concomitantly reduce the pumping volume. The pump capacity is therefore reduced above a certain output or back pressure, making the pump highly efficient in that it only moves enough liquid to produce a predetermined pressure.

Such a pump can only work where the viscosity of the liquid does not vary appreciably. If it were to be used in place of the standard engine gear pump, in cold weather the backpressure created by the highly viscous engine oil would be sufficient to set the pump at a very low or zero displacement. This would result in an excessive reduction in lubricant flow and could lead to damage to the joints in the engine. These joints will heat up and need lubricating rapidly, before the oil in the various feed lines warms up correspondingly and the pump can achieve some meaningful flow with the thinning liquid lubricant. Thus this type of pump is unsuitable for use as an oil pump of an automotive vehicle whose lubricant varies in viscosity and whose pump drive speed in turn varies independently of the engine's need of lubrication or of the viscosity of the oil.

OBJECTS OF THE INVENTION

It is therefore an object of the present invention to provide an improved oil pump for an automotive vehicle.

Another object is the provision of such a oil pump for an automotive vehicle which overcomes the above-given disadvantages, that is which operates efficiently and which provides meaningful lubricant flow even when the lubricant is very viscous, normally when cold.

SUMMARY OF THE INVENTION

The instant invention, most generically described, is a modified vane pump. The known vane pump includes, as described above, a stator having an outer part forming intake and output ports and an inner part pivotal about a pivot axis on the outer part and defining a chamber centered on a stator axis extending between the ports. The ports open axially into the chamber at locations diametrally offset relative to the axis and the chamber is closed radially outwardly relative to the axis by the inner part. A rotor body is rotatable in the chamber about a rotor axis parallel to and normally offset from the stator axis and has an outer surface centered on the rotor axis. This rotor body is formed with a plurality of angularly equispaced and radially extending guides open at the outer surface. Respective vanes of substantially the same radial length are radially displaceably received in the guides and have radially outer ends riding on the inner stator surface and radially opposite inner ends. At least one circular inner ring on the body has an outer ring surface radially outwardly engaging the inner vane ends so the vanes angularly define compartments axially closed by the stator outer part, radially outwardly closed by the stator inner part, and radially inwardly closed by the inner ring. Thus when the stator axis is offset in one direction from the rotor axis and the rotor is rotated in a predetermined sense, the compartments move from the intake to the output port and decrease in volume at the output port. A mechanical biasing unit urges the inner housing part pivotally about the pivot axis in the one direction from an inner position in which the stator and rotor axis are coaxial toward an outer position with these axes relatively widely spaced. A hydraulic biasing unit is pressurized from the outlet port to urge the inner housing part pivotally in the opposite direction toward the inner position. An abutment is connected according to the invention to the biasing means to resist displacement of the inner housing between the outer position and an intermediate position between the inner and outer positions with a predetermined relatively small force, and to resist displacement of the inner housing between the intermediate position and the inner position with a predetermined relatively large force.

Thus with the system of this invention, when the output pressure is unrealistically high, as happens during a cold start, the pump flow volume is artificially increased. The automatic self-regulation of the pump is overridden, giving the pump a stiffer response and ensuring sufficient flow even when back pressure is very high. Under normal operating circumstances the pressure is regulated automatically and no appreciable energy is lost dissipating extra flow from the pump.

The instant invention therefore also comprises a combination of a modified lubricating pump as described above with an automotive-vehicle engine having a lubricating system through which a liquid lubricant needs to be circulated and an output. According to this invention the inner housing part has generally diametrally opposite the pivot axis a radially outwardly projecting adjustment tab, the hydraulic-biasing unit includes a piston-and-cylinder assembly pressurizable to bear against the tab in one angular direction relative to the stator axis to urge the inner housing part in to the inner position, and the fixed-force biasing unit includes a spring and pusher element braced between the tab and the outer housing part and urging same into the outer position.

The abutment according to this invention can be a stationary object, completely limiting the pump flow volume to a certain minimum level. It can also be another spring engageable with the pusher element only when the inner housing element moves toward the inner position into the intermediate position.

In accordance with another feature of this invention the inner housing part is movable through a succession of such intermediate positions and the abutment unit includes respective abutments engageable with the pusher element on displacement of the inner housing part into the respective intermediate positions and respectively differently limiting displacement between the respective intermediate positions and the inner position. As mentioned above, normally at least one of the abutments is a spring.

In other words, the invention generically comprises the combination with an automotive-vehicle engine having a lubricating system through which a liquid lubricant needs to be circulated and an output, of a standard vane-type self-regulating pump, and an abutment unit connected to the adjustment element for limiting displacement of same from an intermediate position between its end positions into the opposite end position corresponding to no flow through the pump. The standard such pump basically has a stator formed with intake and output ports connected to the lubricating system for flow therethrough, a rotor in the stator positively driven by the engine output, an adjustment element operatively connected to the stator and rotor and displaceable between one end position corresponding to relatively great flow through the pump when the rotor is rotated by the output and an opposite end position corresponding to substantially no flow through the pump when the rotor is rotated by the engine output, and biasing means for urging the adjustment element toward the one end position with a fixed force.

DESCRIPTION OF THE DRAWING

The above and other features and advantages will become more readily apparent from the following, reference being made to the accompanying drawing in which:

FIGS. 3, 4, and 5 are charts illustrating the operating principles of this invention.

SPECIFIC DESCRIPTION

Figure 1:
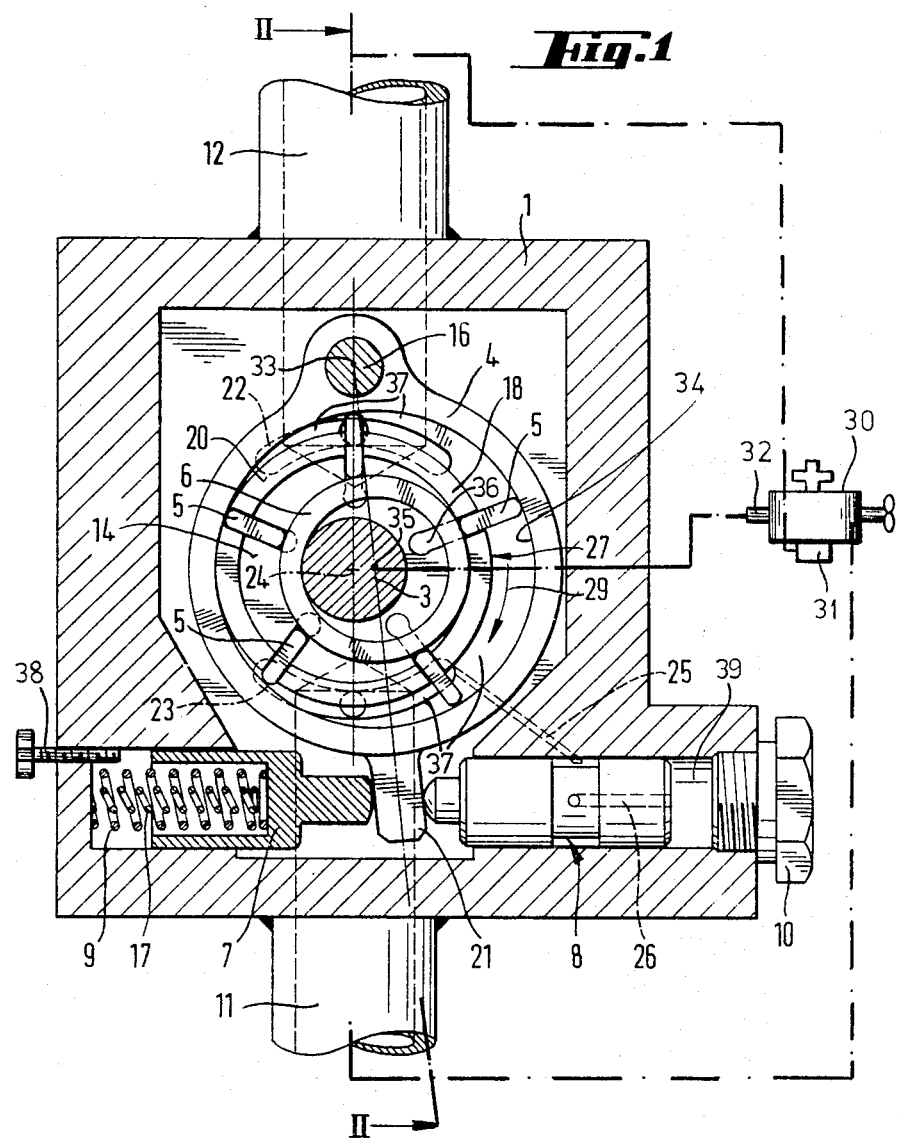
FIG. 1 is a partly cross-sectional and partly schematic view of the pump according to the instant invention.
Figure 2:
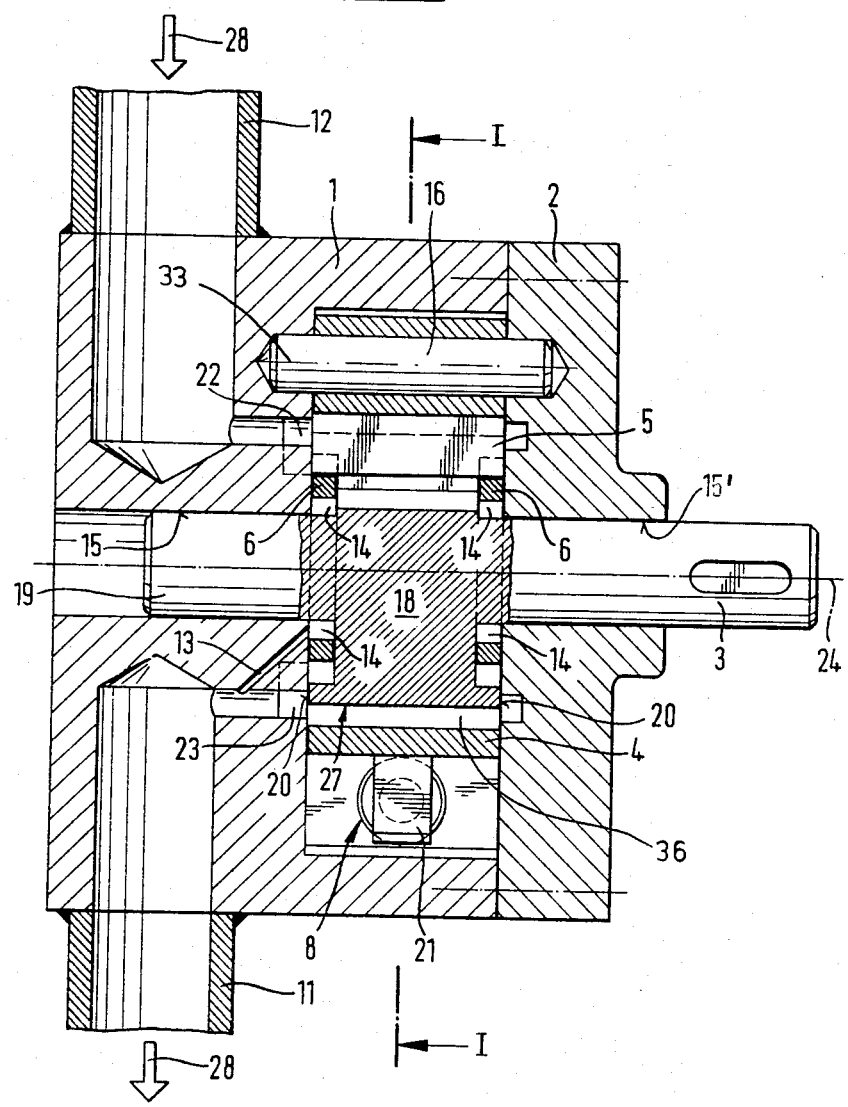
FIG. 2 is a section taken along line II—II of FIG. 1.

As seen in FIG. 1 an engine 30 has an output or drive shaft 32 and a sump-forming oilpan 31. This engine 30 is in a not-illustrated automotive vehicle such as a passenger car.

According to the invention a hollow pump stator housing 1 is sealed axially in one direction by an end plate 2 and carries an intake pipe or line 12 connected to the oilpan 31 and an output line or pipe 11 connected to the various joints of the engine's lubricated system. A pivot pin 16 defining a pivot axis 33 extends between the outer housing part 1 and cover plate 2 and an inner housing part or ring 4 is pivoted on it and has an inner wall or surface 34 centered on a stator axis 35 parallel to the pivot axis 33.

A rotor indicated generally at 27 is carried on a shaft 3 having a bearing end 19 and is rotatable in the stator 1, 2, 4, and 16 about an axis 24 parallel to the axis 33 and spaced therefrom by the same distance as the axis 35. This shaft 3 carries a cylindrical rotor body 18 formed with five angularly equispaced and outwardly directed guide grooves 36 in which are held respective lozenge-section vanes 5 that are all identical and that have rounded outer ends riding on the surface 34. The vanes 5 can move radially in the respective slots 36 and are axially longer than the body 18, projecting from the end faces 20 thereof into annular chambers 14. In these chambers 14 are rings 6 that can move freely radially and that have a cylindrical outer surface that bears radially outward against the rounded inner ends of the vanes 5. The inner diameter of the surface 34 is approximately equal to the outer diameter of the ring 6 plus twice the radial dimension of a one of the identical vanes 5, so that this ring 6 will always be centered on the axis 35 inside the ring 4 no matter what angular position this ring 4 moves into about the axis 33 relative to the axis 24. Thus each vane 5 angularly delimits with the vane 5 behind itself a pumping compartment 37 that is axially closed by the stator housing 1 and end plate 2, radially outwardly closed by the surface 34, and radially inwardly closed by the rotor body 18 and rings 6.

The intake line 12 opens at a standard arcuate intake port 22 formed in the outer housing part 1 to one axial side of the space between the respective ring 6 and the inner surface 34, and an output port 23 connected to the line 11 opens diametrally across inside the ring 4. Under normal conditions the axes 24 and 25 are spaced apart as seen in the drawing in FIG. 1.

In standard vane-pump style, therefore, the rotor 27 is rotated in the direction 29 so that the compartments 37 are of increasing radial dimension and volume as they pass the intake port 22 and are of decreasing radial dimension as they pass the outlet port 23. This action therefore draws in liquid from the oilpan 31 and expels it as shown by arrow 28 to the joints in the engine 30 needing lubrication.

To lubricate the ring 6 and the journal surfaces 15 receiving the shaft portions 19 and 24, a passage 13 is formed that leads from the outlet line 11 to the inner region of the one space 14. The two spaces 14 are interconnected by the grooves 36, so that this pressurized lubricant will automatically be supplied to the pump, greatly simplifying its lubrication.

Obviously if the inner housing ring 4 is stationary relative to the outer part 1 this pump will be of the constant volume type which will have a ratio of flow (e.g. in liters per second) to drive speed (e.g. in revolutions per minute) which will vary substantially directly, discounting leakage. The characteristic curve of this pump is shown by the upper straight mainly solid line of FIG. 3. Nonetheless, as also shown in FIG. 3 by the lower curved solid line, the volume of lubrication needed by the engine is usually substantially less and is not directly related to engine speed, but follows a more quadratic relationship therewith.

Figure 3:
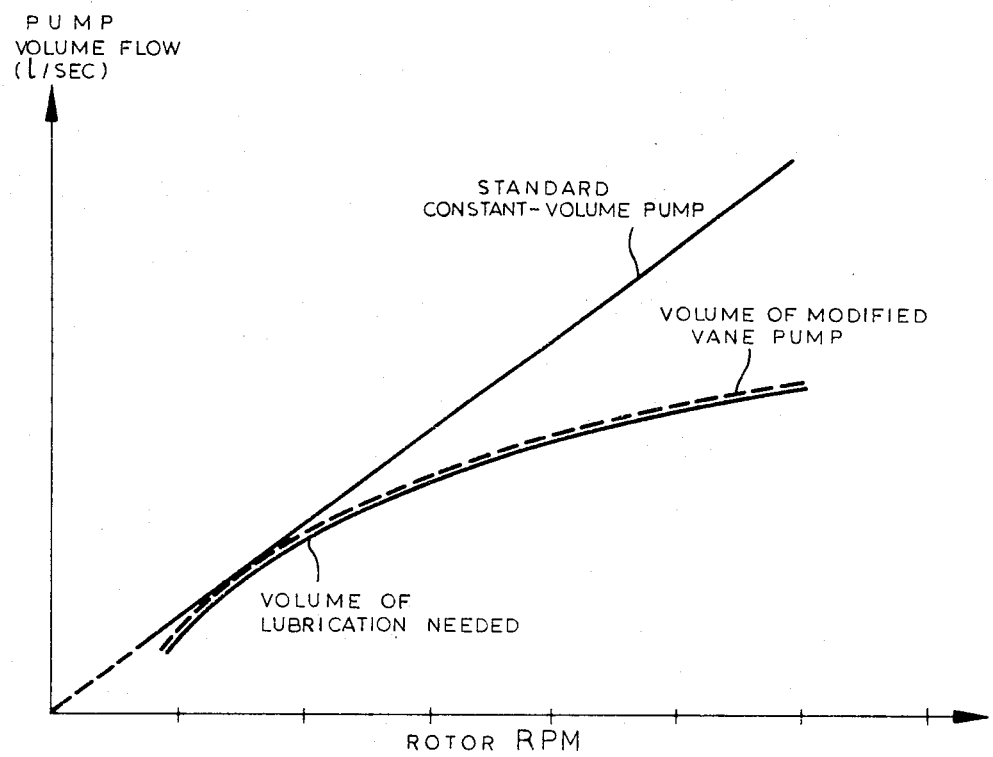

This curve is achieved according to this invention as shown by the dashed line in FIG. 3 by providing the ring 4 with a tab 21 projecting diametrally oppositely from the pivot 16 and bearing in one direction on a pusher cap or piston 7 and oppositely on a small hydraulic piston 8. The piston 8 is pressed against the tab 21 by pressurized oil flowing from the outlet port 23 through passages 25 and 26 to a chamber 39 closed by a plug 10, so that the pressure bearing in this direction on the tab 21 is generally equal to the pump output pressure. The piston 7 is pressed continuously against the tab 21 in the opposite direction by a spring 9, and can on rearward displacement first engage another spring 17 and then a solid but adjustable abutment 38.

Thus when the oil is relatively hot and free-flowing or the pump rotor 27 is turning relatively slowly, the output pressure will be somewhat low and the spring 9 will push the ring 4 over into the illustrated outer position so as to maximize the size of the compartments 37 to one side and thereby maximize volume flow and, normally, thereby increase the pressure. When the backpressure increases somewhat, it will be effective on the piston 8 to compress the spring 7, thereby reducing the size of the compartments 37 and the volume flow of the pump. This should reduce the pressure. Such operation, with the tab 21 moving limitedly back and forth but the pusher 7 never bottoming on the spring 17 is the standard operational mode and automatically tailors the output pressure of the engine to the desired function of the engine speed.

When, however, the output pressure becomes very high, as typically happens on a cold engine start when the lubricating oil is cold and viscous, the pressure in the chamber 39 will push the piston 8 out enough to push the tab 21 and pusher 7 over until the latter bottoms on the spring 17. This immediately increases the resistance to further pivoting of the ring 4 in a direction limiting pump volume flow. Thus the characteristic curve of the pump will flatten out from this intermediate position when the pusher 7 engages the abutment spring 17. The curve flattens completely and there is no further decrease in pump volume flow once the fixed abutment 38 is engaged. This can be seen in FIG. 4 which shows the resistance force when two springs, cutting in at displacements $s_1$ and $s_2$ and a fixed abutment is used cutting in at $s_3$.

FIG. 5 shows at $1'$ the curve for a pump functioning in accordance with the system of the above-mentioned British patent, with a maximum pump flow volume yielding a pressure of about 5bar on a cold a start between 15° C. and 0° C. According to this invention a curve $2'$ is produced with the pump of this invention, yielding a pressure of about 10bar, necessary to move the viscous lubricating oil. Once warm the system of this invention produces a curve $3'$ that produces a flow of 10 liter/min, yielding a pressure of 5bar with the less viscous lubricating oil.

This system is also usable in multiple-stage pumps. A particularly advantageous other use of the system of this invention is in power steering, automatic transmissions, power brakes, and the like.

We claim:

1. In combination with an automotive-vehicle engine having a lubricating system through which a liquid lubricant needs to be circulated and an output, a lubricating pump comprising:

a stator having an outer part forming intake and output ports and an inner part pivotal about a pivot axis on the outer part and having an inner surface defining a chamber centered on a stator axis extending between the ports, the ports opening axially into the chamber at locations diametrally opposite each other relative to the pivot axis and the chamber being closed radially outwardly relative to the axes by the inner part;

an adjustment tab projecting radially outwardly from the inner stator part generally diametrally opposite the pivot axis;

a rotor rotatable in the chamber about a rotor axis normally parallel to and offset from the stator axis and having an outer surface centered on the rotor axis, the rotor being formed with a plurality of angularly equispaced and radially extending guides open at the outer surface;

respective vanes of substantially the same radial length received in the guides and having radially outer ends riding on the inner stator surface and radially opposite inner ends;

at least one circular inner ring in the chamber and having an outer ring surface radially outwardly engaging the inner vane ends, the vanes angularly defining compartments axially closed by the stator outer part, radially outwardly closed by the stator inner part, and radially inwardly closed by the inner ring, whereby, when the stator axis is offset outward from the rotor axis and the rotor is rotated in a predetermined sense, the compartments move from the intake to the output port and decrease in volume at the output port and when the stator and rotor axes are coaxial there is no pumping action even when the rotor turns in the stator;

biasing means including a spring and pusher element braced between the tab and the outer stator part for urging the inner stator part pivotally outward about the pivot axis with a fixed force for separating the pivot and stator axes and thereby increasing the pump flow volume;

hydraulic biasing means pressurized from the output port and including a piston-and-cylinder assembly pressurizable to bear against the tab in one angular direction relative to the stator axis for urging the inner stator part pivotally inwardly for bringing the axes together and thereby decreasing the pump flow volume; and abutment means connected to the inner stator part for permitting relative free movement of the inner stator part in the outer stator part between an intermediate position with the stator and rotor axes relatively close and an outer position with the stator and rotor axes relatively widely spaced, and for limiting movement between the intermediate position and an inner position with the stator and rotor axes coaxial, the abutment means including another spring engageable with the pusher element only when the inner stator part moves toward the inner position from the intermediate position.

* * * * *